(12) United States Patent
Kim et al.

(10) Patent No.: US 11,732,958 B2
(45) Date of Patent: Aug. 22, 2023

(54) REFRIGERATOR AND METHOD OF CONTROLLING A REFRIGERATOR (71) Applicant: LG ELECTRONICS INC., Seoul (KR)

(72) Inventors: Hosan Kim, Seoul (KR); Jaewon Eom, Seoul (KR); Namsoo Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 17/127,704

(22) Filed: Dec. 18, 2020

(65) Prior Publication Data
US 2021/0102751 A1 Apr. 8, 2021

Related U.S. Application Data (63) Continuation of application No. 16/174,891, filed on Oct. 30, 2018, now Pat. No. 10,900,711.

(30) Foreign Application Priority Data

Nov. 1, 2017 (KR) .......................... 10-2017-0144536

(51) Int. Cl.
*F25D 29/00* (2006.01)
*F25D 17/06* (2006.01)
*F25D 11/02* (2006.01)

(52) U.S. Cl.
CPC ............ *F25D 29/00* (2013.01); *F25D 11/022* (2013.01); *F25D 17/065* (2013.01);
(Continued)

(58) Field of Classification Search
CPC ...... F25D 29/00; F25D 11/022; F25D 17/065; F25D 2600/04; F25D 2700/12;
(Continued)

(56) References Cited

U.S. PATENT DOCUMENTS 4,481,787 A * 11/1984 Lynch ..................... F25D 11/02
236/46 R
5,816,054 A * 10/1998 Yoo ....................... F25D 17/065
62/154

(Continued)

FOREIGN PATENT DOCUMENTS

CN 1987300 6/2007
CN 102374722 3/2012
(Continued)

OTHER PUBLICATIONS

Korean Office Action dated Dec. 21, 2021 issued in Application 10-2017-0145238.
(Continued)

*Primary Examiner* — Nelson J Nieves
(74) *Attorney, Agent, or Firm* — Ked & Associates, LLP (57) ABSTRACT

A method of controlling a refrigerator includes starting a first cooling cycle to cool a first storage compartment by operating a compressor and a first fan, determining whether a start condition of a second cooling cycle to cool a second storage compartment is satisfied, operating a second fan for the second storage compartment when the start condition of the second cooling cycle is satisfied, determining whether an output change condition of the second fan is satisfied while the second fan operates, and changing a speed of the second fan when the output change condition of the second fan is satisfied.

18 Claims, 6 Drawing Sheets (52) U.S. Cl.
CPC ... *F25B 2600/112* (2013.01); *F25B 2700/173* (2013.01); *F25D 2600/04* (2013.01); *F25D 2700/12* (2013.01); *F25D 2700/122* (2013.01)

(58) Field of Classification Search
CPC .......... F25D 2700/122; F25B 2600/112; F25B 2700/173
See application file for complete search history.

(56) References Cited

U.S. PATENT DOCUMENTS

| | | | |
|---|---|---|---|
| 5,931,004 A * | 8/1999 | Yoo | F25D 11/022 62/82 |
| 2002/0134095 A1 | 9/2002 | Temmyo | |
| 2003/0097850 A1 | 5/2003 | Chang | |
| 2003/0182957 A1 | 10/2003 | Hu et al. | |
| 2005/0223722 A1* | 10/2005 | Yamashita | F25D 29/00 62/157 |
| 2006/0236707 A1 | 10/2006 | Hong | |
| 2008/0016889 A1 | 1/2008 | Jung | |
| 2009/0113923 A1 | 5/2009 | Song | |
| 2010/0125365 A1 | 5/2010 | Ahn et al. | |
| 2010/0126200 A1 | 5/2010 | Oh | |
| 2010/0126205 A1 | 5/2010 | Oh | |
| 2010/0152902 A1 | 6/2010 | Sung | |
| 2010/0192609 A1 | 8/2010 | Chae | |
| 2011/0041525 A1 | 2/2011 | Kim | |
| 2011/0302939 A1 | 12/2011 | Rockenfeller | |
| 2014/0208783 A1 | 7/2014 | Lee | |
| 2014/0216084 A1 | 8/2014 | Ren | |
| 2015/0168040 A1* | 6/2015 | Kang | F25B 5/04 62/186 |
| 2016/0313054 A1 | 10/2016 | Chung | |
| 2017/0176083 A1 | 6/2017 | Sul | |
| 2019/0120533 A1 | 4/2019 | Lee | |
| 2019/0277559 A1 | 9/2019 | Wang | |

FOREIGN PATENT DOCUMENTS

| | | |
|---|---|---|
| CN | 102506536 | 6/2012 |
| KR | 10-1999-0065321 | 8/1999 |
| KR | 10-2009-0025695 | 3/2009 |
| KR | 10-2009-0046251 | 5/2009 |
| KR | 10-1570348 | 11/2015 |
| KR | 10-1576686 | 12/2015 |
| KR | 10-1576687 | 12/2015 |
| WO | WO 2017/164712 | 9/2017 |

OTHER PUBLICATIONS

Chinese Office Action dated Mar. 2, 2022 issued in CN Application No. 202110312998.9.
European Search Report dated Mar. 22, 2019 issued in EP Application No. 18203841.4.
Korean Office Action dated Jul. 15, 2022 issued in Application No. 10-2022-0070488.
Korean Notice of Allowance dated Oct. 4, 2022 issued in Application 10-2022-0070488.

* cited by examiner

REFRIGERATOR AND METHOD OF CONTROLLING A REFRIGERATOR

CROSS-REFERENCE TO RELATED APPLICATIONS

This application is a Continuation of U.S. application Ser. No. 16/174,891, filed on Oct. 30, 2018, which claims priority under 35 U.S.C. § 119 to Korean Application No. 10-2017-0144536, filed on Nov. 1, 2017, whose entire disclosures are hereby incorporated by reference.

BACKGROUND

1. Field

A refrigerator and a method for controlling a refrigerator are disclosed herein.

2. Background

Refrigerators are home appliances that may store food or other objects at a low temperature. A storage compartment may be maintained at a constant low temperature. In the case of household refrigerators, the storage compartment may be maintained at a temperature within an upper limit temperature and lower limit temperature range on the basis of a set temperature.

The refrigerator may be controlled by a method such that when the storage compartment increases to the upper limit temperature, a refrigeration cycle operates to cool the storage compartment, and when the storage compartment reaches the lower limit temperature, the refrigeration cycle is stopped. Refrigerators have been developed in which an evaporator is installed in a freezing compartment and a refrigerating compartment. Such a refrigerator may allow the refrigerant to flow to one evaporator of each of the freezing compartment and the refrigerating compartment and then to flow to the other evaporator.

A control method for the aforementioned refrigerator is disclosed in Korean Patent Registration No. 10-1576686 (Registered on Dec. 4, 2016), whose disclosure is hereby incorporated by reference in its entirety. In the control method, after a refrigerating compartment valve and a refrigerating compartment fan operate to cool the refrigerating compartment, a freezing compartment valve and a freezing compartment fan may operate to cool the freezing compartment.

Also, after the cooling of the freezing compartment is completed, the compressor may be stopped. As such, the freezing compartment fan may rotate to reduce a temperature of the freezing compartment by latent heat of evaporation.

However, in the related art, although the temperature of the freezing compartment decreases when the compressor is stopped, the temperature of the refrigerating compartment may not decrease. The freshness of food stored in the refrigerating compartment may be higher as a variation in temperature of the refrigerating compartment is smaller. If the freshness of the foods is high, a storage period of the foods may increase.

However, in the related art, when the compressor is stopped, the temperature of the refrigerating compartment may continuously increase until the compressor operates again to cool the refrigerating compartment. When the compressor operates again, the temperature of the refrigerating compartment may decrease which may increase a variation of the temperature. Thus, the freshness of the foods stored in the refrigerating compartment may be deteriorated.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Referring to FIGS. 1 to 4, the refrigerator 1 may include a cabinet 10 that forms an appearance of the refrigerator and doors 11 and 14 movably connected to the cabinet 10. A storage compartment in which food is stored may be formed in the cabinet 10. The storage compartment may include a refrigerating compartment 112 and a freezing compartment 111 located below the refrigerating compartment 112. The freezing compartment 111 and the refrigerating compartment 112 may be vertically partitioned by a partitioning wall 113 in the cabinet 10.

Figure 1:
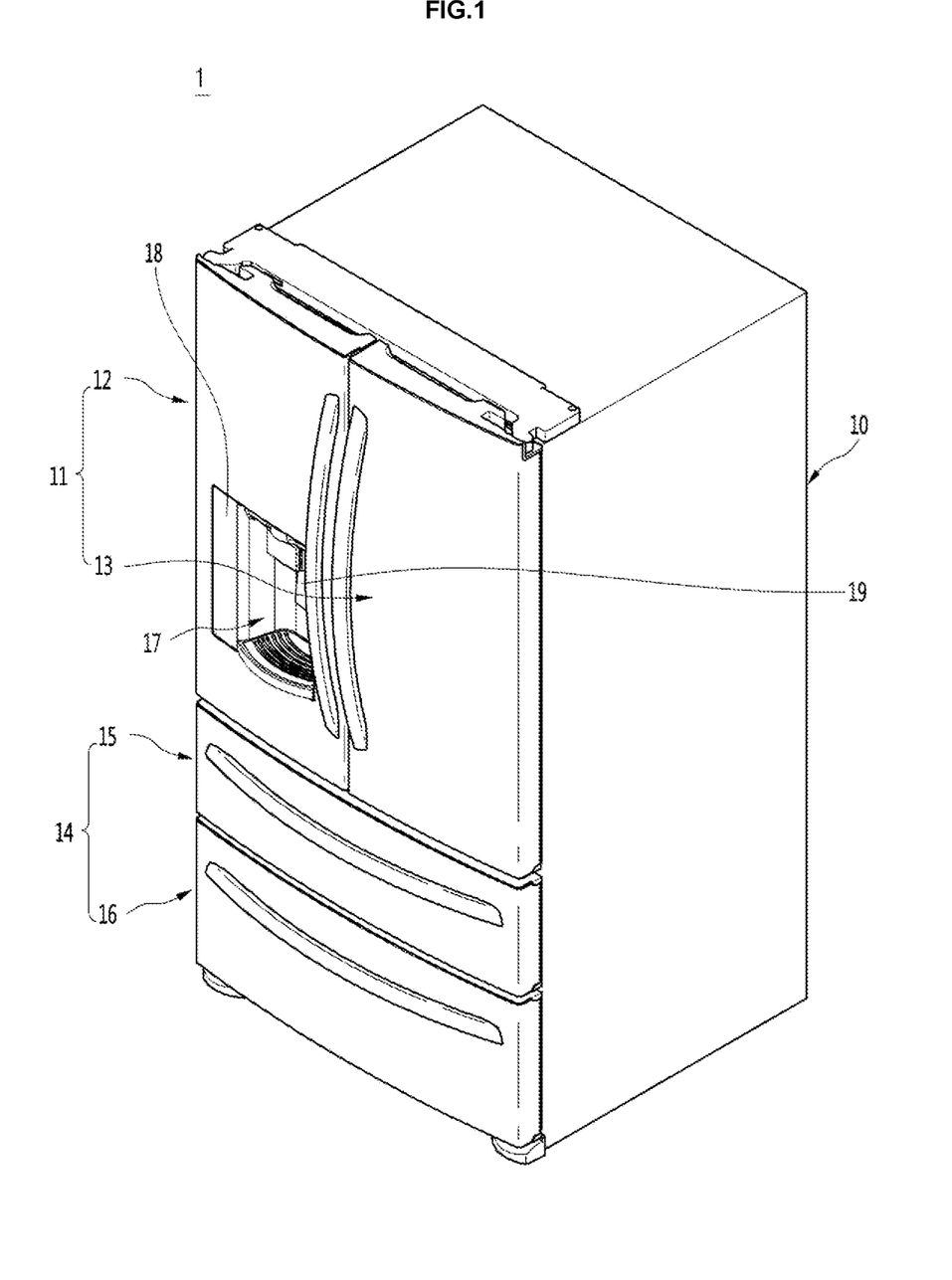
FIG. 1 is a perspective view of a refrigerator according to an embodiment.
Figure 2:
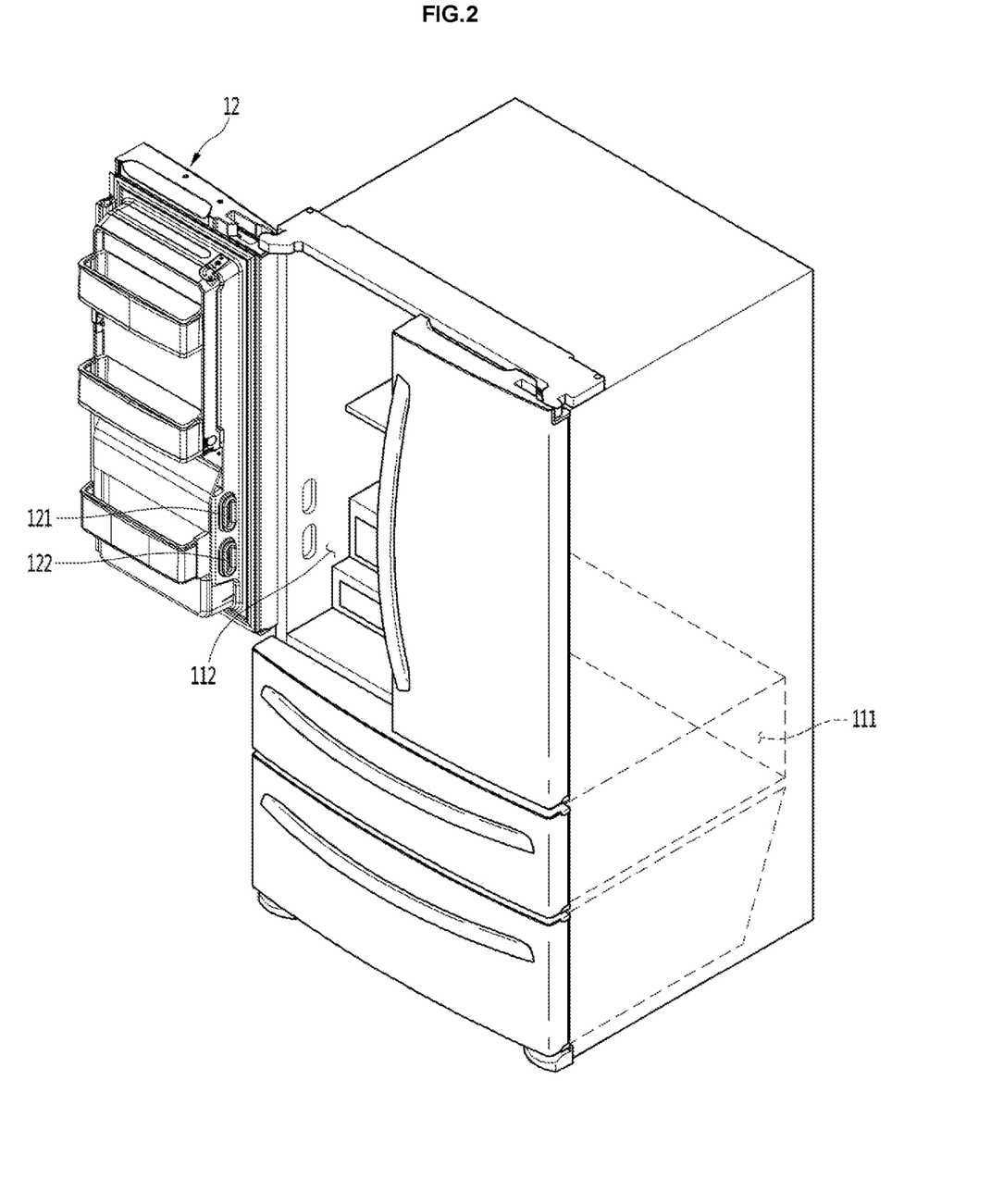
FIG. 2 is a perspective view of the refrigerator when a door is opened according to the embodiment.

Although a bottom freeze type refrigerator in which a refrigerating compartment is placed above a freezing compartment is described in the present embodiment, the present embodiment is applicable to a refrigerator in which a refrigerating compartment is placed below a freezing compartment, a refrigerator having only a freezing compartment or a refrigerator in which a freezing compartment and a refrigerating compartment are placed side by side. The doors 11 and 14 may include a refrigerating compartment door 11 that opens and closes the refrigerating compartment 112 and a freezing compartment door 14 that opens and closes the freezing compartment 111.

The refrigerating compartment door 11 may include a plurality of doors 12 and 13 provided side by side. The plurality of doors 12 and 13 may include a first refrigerating compartment door 12 and a second refrigerating compartment door 13 arranged adjacent to the first refrigerating compartment door 12. The first refrigerating compartment door 12 and the second refrigerating compartment door 13 may move independently.

The freezing compartment door 14 may include a plurality of doors 15 and 16 arranged adjacent to each other in a vertical direction. The plurality of doors 15 and 16 may include a first freezing compartment door 15 and a second freezing compartment door 16 located below or above the first freezing compartment door 15. The first and second refrigerating compartment doors 12 and 13 may rotate and the first and second freezing compartment doors 15 and 16 may slide, however, the disclosure is not limited to this. In another example, the first freezing compartment door 15 and the second freezing compartment door 16 may be arranged side by side and may rotate.

A dispenser 17 configured to dispense water and/or ice may be provided in any one of the first and second refrigerating compartment doors 12 and 13. FIG. 1 shows the dispenser 17 provided in the first refrigerating compartment door 12, for example. The dispenser 17 may also be provided in any one of the freezing compartment doors 15 and 16.

An ice making compartment configured to make and store ice and an ice making assembly accommodated in the ice making compartment may be provided in any one of the first and second refrigerating compartment doors 12 and 13. Alternatively, the ice making assembly may be provided in the freezing compartment 111. A cold air inlet 121 and a cold air outlet 122 may be formed in any one of the first and second refrigerating compartment doors.

The ice making assembly may include an ice maker and an ice bin configured to store ice made in the ice maker. The ice maker may receive cold air of the freezing compartment 11 and may make ice. The ice making assembly may be implemented by a well-known technology and thus a detailed description thereof will be omitted.

The dispenser 17 and the ice making assembly may be provided in the first refrigerating compartment door 12 or the second refrigerating compartment door 13. Hereinafter, assume that the dispenser 17 and the ice making assembly are provided in the refrigerating compartment door 11 including the first refrigerating compartment door 12 and the second refrigerating compartment door 13.

An input unit (or input) 18 through which a user may select the type of ice to be dispensed may be provided in the refrigerating compartment door 11. In addition, the dispenser 17 may include an operation pad 19 operated by a user in order to dispense water or ice. Alternatively, a button or a touch panel may be provided in order to input a command for dispensing water or ice.

Figure 3:
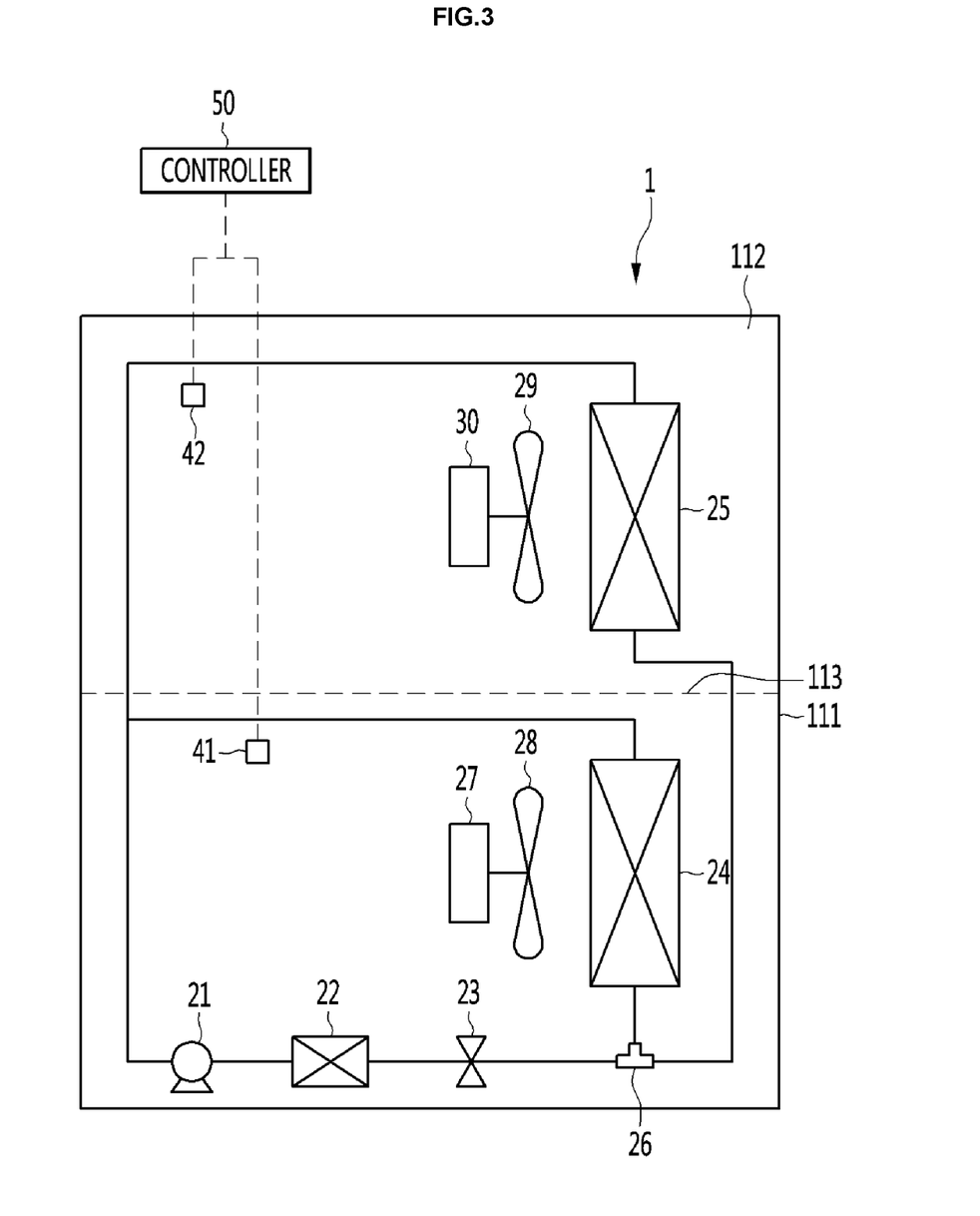
FIG. 3 is a schematic view showing the configuration of the refrigerator according to the embodiment.

The refrigerator 1 may further include a compressor 21, a condenser 22, an evaporator 24 for a freezing compartment (or referred to as a "second evaporator"), which receives the refrigerant from the compressor 21 to generate cold air to cool the freezing compartment 111, and an evaporator 25 for a refrigerating compartment (or referred to as a "first evaporator"), which receives the refrigerant from the compressor 21 to generate cold air to cool the refrigerating compartment 112. The refrigerator 1 may include a switching valve 26 that allows the refrigerant passing through an expansion member 23 to flow to one of the evaporator 24 for the freezing compartment or the evaporator 25 for the refrigerating compartment.

In the present embodiment, the state in which the switching valve 26 operates so that the refrigerant flows to the evaporator 24 for the freezing compartment may be referred to as a first state of the switching valve 26. Also, the state in which the switching valve 26 operates so that the refrigerant flows to the evaporator 25 for the refrigerating compartment may be referred to as a second state of the switching valve 26. The switching valve 26 may be, for example, a three way valve.

The refrigerator 1 may further include a freezing compartment fan 28 (referred to as a "second cooling fan") configured to blow air to the evaporator 24 for the freezing compartment, a first motor 27 that rotates the freezing compartment fan 28, a refrigerating compartment fan 29 (referred to as a "first cooling fan") configured to blow air to the evaporator 25 for the refrigerating compartment, and a second motor 30 that rotates the refrigerating compartment fan 29. A series of cycles in which the refrigerant flows to a compressor 21, a condenser 22, an expansion member 23, and the evaporator 24 for the freezing compartment is referred to as a "freezing cycle", and a series of cycles in which the refrigerant flows to the compressor 21, the condenser 22, the expansion member 23, and the evaporator 25 for the refrigerating compartment is referred to as a "refrigerating cycle".

The freezing compartment fan 28 may rotate during the freezing cycle operation, and the refrigerating compartment fan 29 may rotate during the refrigerating cycle operation. The compressor 21 may continuously operate during the operation of each of the freezing cycle and the refrigerating cycle.

Although one expansion member 23 is provided at an upstream side of the switching valve 26 as described above, a first expansion member may be provided between the switching valve 26 and the evaporator 24 for the freezing compartment, and a second expansion member may be provided between the switching valve 26 and the evaporator 25 for the refrigerating compartment. For another example, a first valve may be provided at an inlet side of the evaporator 24 for the freezing compartment, and a second valve may be provided at an inlet side of the evaporator 25 for the refrigerating compartment without using the switching valve 26. While the freezing cycle operates, the first valve may be turned on, and the second valve may be turned off. When the refrigerating cycle operates, the first valve may be turned off, and the second valve may be turned on.

The refrigerator 1 may further include an ice making fan 31 configured to blow cold air of the freezing compartment 111 toward the ice making assembly. The ice making fan 31 may be located in a duct that guides cold air of the freezing compartment 111 toward the ice making assembly in the freezing compartment 111 or the cabinet 10, without being limited thereto.

Figure 4:
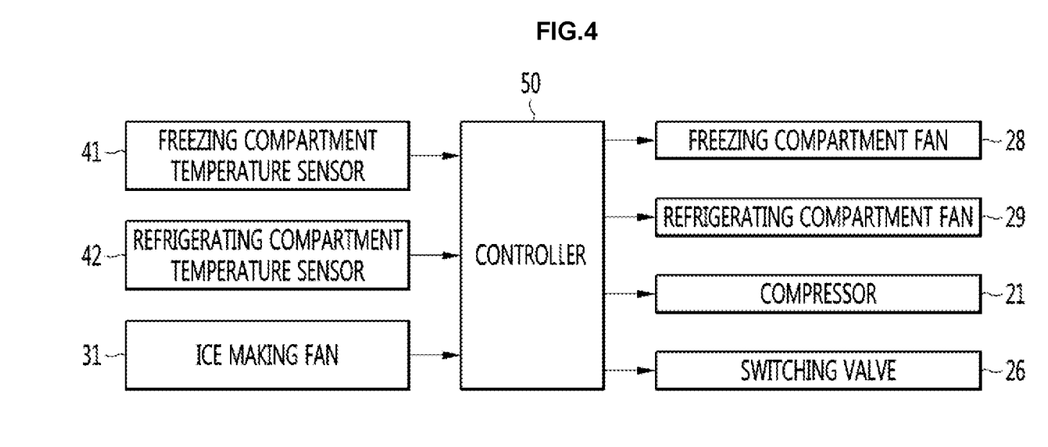
FIG. 4 is a block diagram of the refrigerator according to the embodiment.

The ice making fan 31 may be interlocked with the freezing compartment fan 28. That is, the ice making fan 31 may operate when the freezing compartment fan 28 operates and may be stopped when the freezing compartment fan 28 is stopped. The refrigerator 1 may further include a freezing compartment temperature sensor 41 configured to sense a temperature of the freezing compartment 111, a refrigerating compartment temperature sensor 42 configured to sense a temperature of the refrigerating compartment 112, the input 18 through which the user may input a set temperature (or a target temperature) of each of the freezing compartment 111 and the refrigerating compartment 112, and a control unit (or controller) 50 that controls the cooling cycle (including the freezing cycle and the refrigerating cycle) on the basis of the input set temperature and the temperatures sensed by the temperature sensors 41 and 42.

A temperature less than that set temperature of the freezing compartment 111 may be called a first freezing compartment reference temperature (or a lower limit temperature), and a temperature greater than the set temperature of the freezing compartment 111 may be called a second freezing compartment reference temperature (or an upper limit temperature). A range between the first freezing compartment reference temperature and the second freezing compartment reference temperature may be called a freezing compartment set temperature range. Although not limited, the set temperature of the freezing compartment 111 may be a mean temperature of the first freezing compartment reference temperature and the second freezing compartment reference temperature.

A temperature less than that set temperature of the refrigerating compartment 112 may be called a first refrigerating compartment reference temperature (or a lower limit temperature), and a temperature greater than the set temperature of the refrigerating compartment 112 may be called a second refrigerating compartment reference temperature (or an upper limit temperature). A range between the first refrigerating compartment reference temperature and the second refrigerating compartment reference temperature may be called a refrigerating compartment set temperature range. Although not limited, the target temperature of the refrigerating compartment 112 may be a mean temperature of the first refrigerating compartment reference temperature and the second refrigerating compartment reference temperature.

A user may set a set temperature of each of the freezing compartment 111 and the refrigerating compartment 112 through the input 18. The controller 50 may control the temperature of the refrigerating compartment 112 to be maintained within the set temperature range. The controller 50 may operate the refrigerating cycle when the sensed temperature of the refrigerating compartment 112 is equal to or greater than the reference temperature of the second refrigerating compartment (satisfying a refrigerating cycle start condition), and the refrigerating cycle may be stopped when the sensed temperature of the refrigerating compartment 112 is equal to or below the first refrigerating compartment reference temperature (satisfying a refrigerating cycle start condition or a refrigerating cycle stop condition). When the sensed temperature of the freezing compartment 111 is less than the first freezing compartment reference temperature when the temperature of the refrigerating compartment 112 is greater than the first refrigerating compartment reference temperature while the freezing cycle operates, the freezing cycle may be stopped (the freezing cycle stop condition is satisfied).

The satisfaction of the start condition of the refrigerating cycle may take precedence over the satisfaction of the stop condition of the freezing cycle. This is because influence on the freshness of an object to be stored may be larger when the temperature change difference of the refrigerating compartment is large, as compared to when the temperature change difference of the freezing compartment is large.

For example, when the start condition of the refrigerating cycle is satisfied before the stop condition of the freezing cycle is satisfied during the operation of the freezing cycle, the freezing cycle may be stopped, and the refrigerating cycle may start. In the present embodiment, a basic refrigerant cycle for cooling the storage compartment may be performed in order of a first refrigerating cycle, a freezing cycle, a second refrigerating cycle and compressor stop.

For example, after the first refrigerating cycle operates, the first refrigerating cycle may be stopped and the freezing cycle may operate. When the stop condition of the freezing cycle is satisfied, after the second refrigerating cycle operates, the compressor 21 may be stopped for a predetermined time, or while a specific condition is satisfied. In the present embodiment, the second refrigerating cycle may be omitted. In this case, when the freezing cycle is stopped, the compressor 21 may be stopped for a predetermined time or while a specific condition is satisfied.

In the present embodiment, the basic refrigerant cycle may be performed in order to stabilize the refrigerant cycle. During operation of the freezing cycle, if the start condition of the refrigerating cycle is satisfied before the stop condition of the freezing cycle is satisfied, the first refrigerating cycle may restart instead of the second refrigerating cycle.

Thus, the refrigerant cycle may not be stable. Accordingly, the method of controlling the refrigerator according to the present embodiment may include a protection logic that allows the refrigerant cycle to stably operate. The protection logic will be described below.

Figure 5:
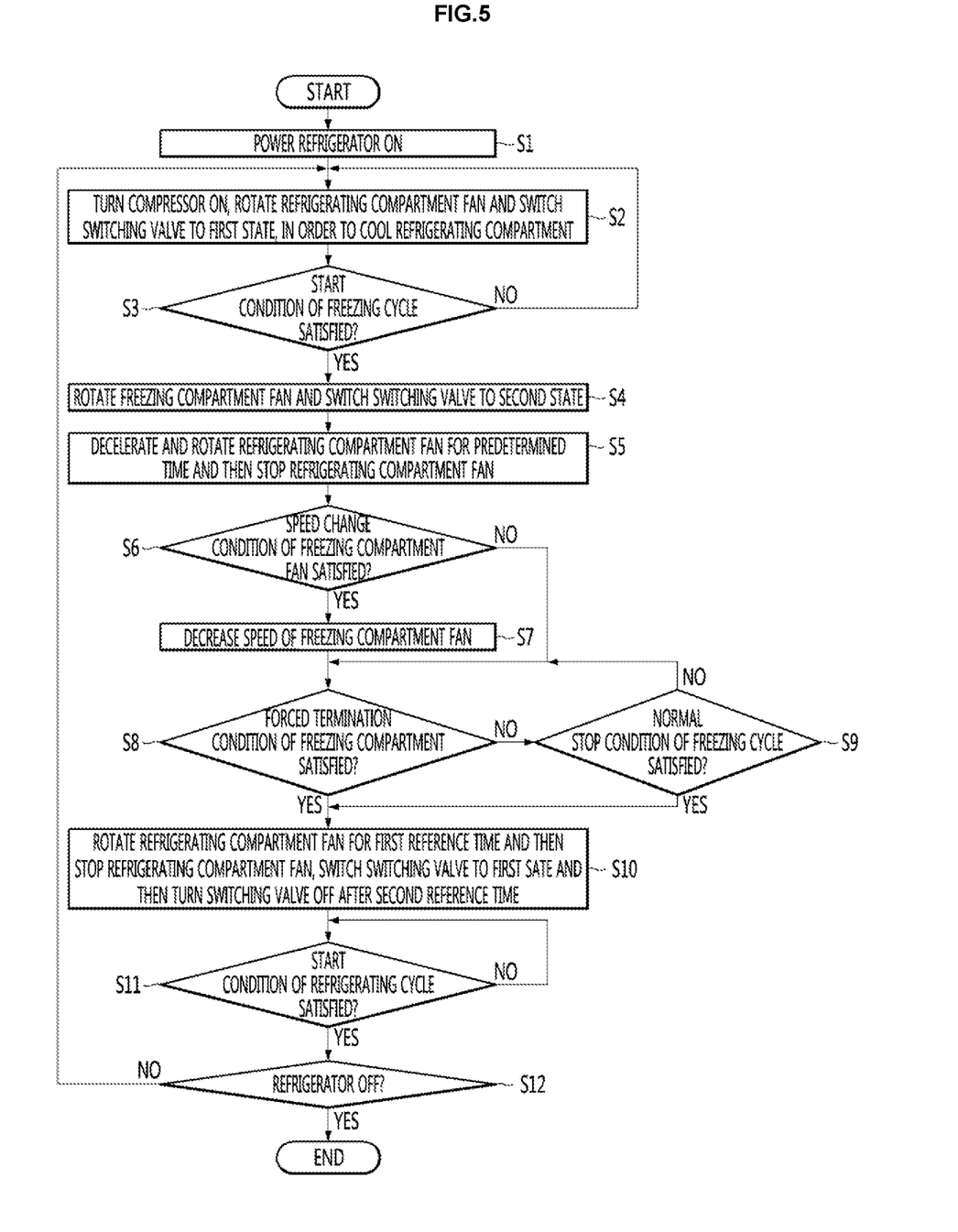
FIG. 5 is a flowchart illustrating a method of controlling a refrigerator according to an embodiment.
Figure 6:
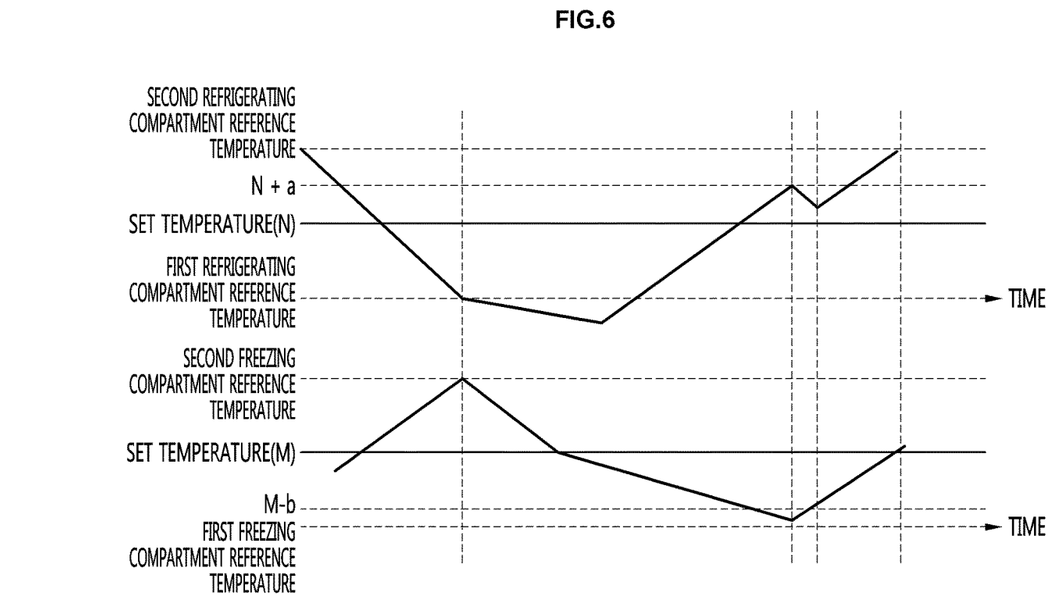
FIG. 6 is a diagram showing temperature change of a storage compartment according to the method.

Referring to FIGS. 5 and 6, the refrigerator 1 may be powered on (51). When the refrigerator 1 is powered on, the refrigerator 1 may cool the freezing compartment 111 or the refrigerating compartment 112.

Hereinafter, the method of controlling the refrigerator when the freezing compartment 111 is cooled after cooling the refrigerating compartment 112 will be described. In order to cool the refrigerating compartment 112, the controller 50 may turn the compressor 21 on and rotate the refrigerating compartment fan 29 (S2). In addition, the controller 50 may switch the switching valve 26 to a first state such that refrigerant flows to the evaporator 25 for the refrigerating compartment (S2).

In addition, when the refrigerating cycle operates, the freezing compartment fan 28 may remain stopped. The refrigerant passing through the condenser 22 after being compressed in the compressor 21 may then flow to the evaporator 25 for the refrigerating compartment through the switching valve 26. In addition, the refrigerant evaporated while flowing through the evaporator 25 for the refrigerating compartment may flow into the compressor 21 again.

In addition, air, which has exchanged heat with the evaporator 25 for the refrigerating compartment, may be supplied to the refrigerating compartment 112. Accordingly, the temperature of the refrigerating compartment 112 may decrease but the temperature of the freezing compartment 111 may increase.

During operation of the refrigerating cycle, the controller 50 may determine whether the start condition of the freezing compartment is satisfied (S3). That is, the controller 50 may determine whether the stop condition of the refrigerating cycle is satisfied.

For example, the controller 50 may determine that the start condition of the freezing compartment is satisfied, when the temperature of the refrigerating compartment 112 is equal to or less than a first refrigerating compartment reference temperature.

Upon determining that the start condition of the freezing compartment is satisfied in step S3, the controller 50 may operate the freezing cycle. For example, the controller 50 may switch the switching valve 26 to a second state such that the refrigerant flows to the evaporator 24 for the freezing compartment (S4). Even when the refrigerating cycle is switched to the freezing cycle, the compressor 21 may continuously operate without being stopped. In addition, the controller 50 may rotate the freezing compartment fan 28.

As described above, when the freezing compartment fan 28 rotates, the ice making fan 31 may also rotate. By rotation of the freezing compartment fan 28, cold air may be supplied to the freezing compartment 111 and cold air of the freezing compartment 111 may be supplied toward the ice making assembly located in the refrigerating compartment door by the ice making fan 31.

When operation of the refrigerating cycle starts, the refrigerating compartment fan 29 may continuously rotate without being stopped. However, in order to prevent the temperature of the refrigerating compartment 112 from rapidly decreasing by rotation of the refrigerating compartment fan 29, when the freezing cycle starts, the refrigerating compartment fan 29 may be rotated at a lower rotational speed.

For example, the refrigerating compartment fan 29 may rotate at a first RPM (or first output) while the refrigerating cycle operates and may rotate at a second RPM (or second output) less than the first RPM when the refrigerating cycle is stopped. When the refrigerating compartment fan 29 is rotated at the second RPM when the refrigerating cycle is stopped, it may be possible to delay the rise of the temperature of the refrigerating compartment 112 during the operation of the freezing cycle.

When the rise of the temperature of the refrigerating compartment 112 is delayed, a time required for the temperature of the refrigerating compartment 112 to reach the second refrigerating compartment reference temperature may be delayed even when the operation time of the freezing cycle is increased. In addition, when the refrigerating compartment fan 29 is rotated at the second RPM when the refrigerating cycle is stopped, it may be possible to minimize the temperature decreasing width of the refrigerating compartment 112 until the refrigerating compartment fan 29 is stopped.

When the refrigerating compartment fan 29 continuously rotates when the refrigerating cycle is stopped, the temperature of the refrigerating compartment 112 may be decreased to a temperature lower than the first refrigerating compartment reference temperature. At this time, when the refrigerating compartment fan 29 is rotated at the second RPM when the refrigerating cycle is stopped, the temperature decreasing width of the refrigerating compartment 112 may be minimized.

As the temperature change difference of the refrigerating compartment 112 is decreased, the freshness of the object to be stored may be improved. It may therefore be possible to minimize a drop in the freshness of the object to be stored, by minimizing the temperature change difference of the refrigerating compartment 112.

The refrigerating compartment fan 29 may be stopped when a predetermined time elapses after being rotated at the second RPM (S5). During operation of the freezing cycle, the controller 50 may determine whether the speed change condition of the freezing compartment fan 28 is satisfied (S6).

When the freezing cycle starts, the temperature of the freezing compartment 111 may be equal or similar to the second freezing compartment reference temperature. In addition, the temperature of the freezing compartment 111 may be decreased by operation of the freezing cycle.

The controller 50 may determine whether the speed change condition of the freezing compartment fan 28 is satisfied, for example, when the temperature of the freezing compartment 111 reaches a freezing compartment set temperature M. For example, the controller 50 may determine that the speed change condition of the freezing compartment fan 28 is satisfied, when the temperature of the refrigerating compartment 112 is less than a refrigerating compartment set temperature N.

When the speed change condition of the freezing compartment fan 28 is satisfied, the controller 50 may decrease the rotation speed of the freezing compartment fan 28 (S7). In the present embodiment, when the rotation speed of the freezing compartment fan 28 is decreased, it may be possible to increase the operation time of the freezing cycle.

Since the ice making fan 31 is interlocked with the freezing compartment fan 28, when the operation time of the freezing cycle is increased, the operation time of the ice making fan 31 may be increased, thereby increasing the amount of ice made in the ice making assembly. At this time, the rotation speed of the refrigerating compartment fan 28 may vary according to the temperature of the refrigerating compartment 112.

For example, a first fan reference temperature lower than the refrigerating compartment set temperature N by a reference temperature value and a second fan reference temperature lower than the first fan reference temperature by the reference temperature value may be set. Before the temperature of the freezing compartment 111 reaches the freezing compartment set temperature M, the freezing compartment fan 28 may rotate at a first rotation speed.

When the temperature of the freezing compartment 111 reaches the freezing compartment set temperature M, if the temperature of the refrigerating compartment 112 is in a range from the refrigerating compartment set temperature N to the first fan reference temperature, the freezing compartment fan 28 may rotate at a second rotation speed lower than the first rotation speed. When the temperature of the freezing compartment 111 reaches the freezing compartment set temperature M, if the temperature of the refrigerating compartment 112 is in a range from the first fan reference temperature to the second fan reference temperature, the freezing compartment fan 28 may rotate at a third rotation speed lower than the second rotation speed.

In other words, when the temperature of the freezing compartment 111 reaches the freezing compartment set temperature M, as the temperature of the refrigerating compartment 112 is decreased, the rotation speed of the freezing compartment fan 28 may be decreased. As the temperature of the refrigerating compartment 112 is decreased, a time required for the temperature of the refrigerating compartment 112 to reach the second refrigerating compartment reference time may be increased.

By maintaining the rotation speed of the freezing compartment fan 28 at a low speed, it may be possible to maximally increase the operation time of the freezing cycle. It may then be possible to increase the amount of ice made in the ice making assembly and to decrease the temperature change difference of the refrigerating compartment 112.

In contrast, as the result of determination of step S6, even when the temperature of the freezing compartment 111 reaches the freezing compartment set temperature M, if the temperature of the refrigerating compartment 112 is equal to or greater than the refrigerating compartment set temperature N, the controller 50 may determine that the speed change condition of the freezing compartment fan 28 is not satisfied (protection logic 1). In this case, the rotation speed of the freezing compartment fan 28 may be maintained at a previous speed.

When the temperature of the refrigerating compartment 112 is equal to or greater than the refrigerating compartment set temperature N, since a time required for the temperature of the refrigerating compartment 112 to reach the second refrigerating compartment reference temperature is short, the temperature of the freezing compartment 111 may rapidly decrease before the temperature of the refrigerating compartment 112 reaches the second refrigerating compartment reference temperature. It may be possible to prevent the temperature of the refrigerating compartment 112 from reaching the second refrigerating compartment reference temperature before the temperature of the freezing compartment 111 reaches the first refrigerating compartment reference temperature (protection logic 1).

The controller 50 may determine that the forced termination condition of the freezing cycle is satisfied during operation of the freezing cycle (S8) (protection logic 2). For example, the controller 50 may determine that the forced termination condition of the freezing cycle is satisfied when the temperature of the refrigerating compartment 112 is equal to or greater than a first termination reference temperature N+a which is higher than the refrigerating compartment set temperature N and lower than the second refrigerating compartment reference temperature and the temperature of the freezing compartment 111 is equal to or less than a second termination reference temperature M-b which is lower than the freezing compartment set temperature M and higher than the first freezing compartment reference temperature.

When the freezing cycle is forcibly terminated, the start condition of the refrigerating cycle may not be satisfied before the stop condition of the freezing cycle is satisfied. At this time, since the temperature of the freezing compartment 111 is close to the first freezing compartment reference temperature, even if the freezing cycle is forcibly terminated, the temperature of the freezing compartment 111 may be maintained in the freezing compartment set temperature.

The controller 50 may determine whether the normal stop condition of the freezing cycle is satisfied (S9) when the forced termination condition of the freezing cycle is not satisfied. When the normal stop condition of the freezing cycle is satisfied, the temperature of the freezing compartment 111 may be equal to or less than the first freezing compartment reference temperature.

If the forced termination condition of the freezing cycle is satisfied in step S8 or if the stop condition of the freezing cycle is satisfied in step S9, the freezing cycle may be stopped. The freezing compartment fan 28 may then be stopped and the switching valve 26 may be switched to the first state. In addition, the refrigerating compartment fan 29 may rotate (the second refrigerating cycle may be performed) (S10).

The refrigerating compartment fan 29 may be stopped after being rotated for a first reference time period and the switching valve 26 may be turned off after a second reference time period less than the first reference time period. When the switching valve 26 is turned off, the compressor 21 may also be stopped. In other words, after the switching valve 26 is turned off, the refrigerating compartment fan 29 may be further rotated for a predetermined time and then the refrigerating compartment fan 29 may be stopped.

When the second refrigerating cycle starts after the freezing cycle is stopped, it may be possible to delay a rise of the temperature of the refrigerating compartment 112 in a period in which the compressor is stopped after the second refrigerating cycle. The controller 50 may determine whether the start condition of the refrigerating cycle is satisfied when the compressor 21 is turned off (S11). Upon determining that the start condition of the refrigerating cycle is satisfied in step S11, the refrigerating cycle starts (returns to step S2) unless power is turned off (S12).

In this specification, the refrigerating compartment may be referred to as a first storage compartment and the freezing compartment may be referred to as a second storage compartment. The refrigerating cycle may be referred to as a first cooling cycle for the first storage compartment and the freezing cycle may be referred to as a second cooling cycle for the second storage compartment. The first refrigerating cycle may be referred to as a first cooling cycle and the second refrigerating cycle may be referred to as a second cooling cycle.

In addition, the refrigerating compartment fan 29 may be referred to as a first cold air supply unit for the first storage compartment and the freezing compartment fan 28 may be referred to as a second cold air supply unit for the second storage compartment. An increase in rotation speed of the refrigerating compartment fan and/or the freezing compartment fan may be referred to as an increase in output of the cold air supply unit and a decrease in rotation speed of the refrigerating compartment fan and/or the freezing compartment fan may be referred to as a decrease in output of the cold air supply unit.

Although the refrigerator in which two cooling cycles are configured using one compressor and two evaporators is described in the above embodiment, the control method for decreasing the temperature change width of the storage compartment of the present embodiment is applicable to a refrigerator in which two cooling cycles are configured using two compressors and two evaporators. In this case, the cold air supply unit may include fans (a refrigerating compartment fan and a freezing compartment fan) that blow air to compressors (a compressor for a freezing compartment and a compressor for a refrigerating compartment) and evaporators (an evaporator for a freezing compartment and an evaporator for a refrigerating compartment).

The present embodiment provides a refrigerator which is controlled to reduce a variation in temperature of a storage chamber so as to improve freshness of a stored object and a control method therefor. The present embodiment provides a refrigerator capable of increasing the amount of made ice while reducing temperature change of a storage compartment, and a control method therefor.

A method of controlling a refrigerator may include starting a first cooling cycle to cool a first storage compartment to operate a compressor and operating a first cold air supply unit for the first storage compartment, determining whether a start condition of a second cooling cycle to cool a second storage compartment is satisfied, operating a second cold air supply unit for the second storage compartment when the start condition of the second cooling cycle is satisfied, determining whether an output change condition of the second cold air supply unit is satisfied while the second cold air supply unit operates, and changing output of the second cold air supply unit when the output change condition of the second cold air supply unit is satisfied.

A refrigerator may include a compressor, a condenser configured to condense refrigerant discharged from the compressor, an evaporator for a freezing compartment and an evaporator for a refrigerating compartment branched from an outlet side of the condenser, a switching valve configured to allow the refrigerant to flow to any one of the evaporator for the freezing compartment and the evaporator for the refrigerating compartment, a freezing compartment fan configured to allow air to flow to the evaporator for the freezing compartment, a refrigerating compartment fan configured to allow air to flow to the evaporator for the refrigerating compartment, and a controller configured to control the switching value and each of the fans.

When a refrigerating cycle operates, the controller may allow the refrigerant to flow to the evaporator for the refrigerating compartment by the switching valve and may allow the refrigerating compartment fan to be rotated, and, when a freezing cycle operates, the controller may allow the refrigerant to flow to the evaporator for the freezing compartment by the switching valve and may allow the freezing compartment fan to be rotated. During operation of the freezing cycle, the controller may determine that a speed change condition of the freezing compartment fan is satisfied and may decrease a rotation speed of the freezing compartment fan when the speed change condition of the freezing compartment fan is satisfied.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a refrigerator, the method comprising:
   starting a first cooling cycle that cools a first storage compartment by operating a compressor and a first fan;
   determining whether a start condition of a second cooling cycle that cools a second storage compartment is satisfied;
   operating a second fan for the second storage compartment when the start condition of the second cooling cycle is satisfied;
   determining whether a forced termination condition of the second cooling cycle is satisfied before a normal stop condition of the second cooling cycle is satisfied; and
   stopping the second cooling cycle when the forced termination condition of the second cooling cycle is satisfied before the normal stop condition of the second cooling cycle is satisfied,
   wherein, to determine whether the forced termination Condit on of the second cooling cycle is satisfied, a controller determines whether a temperature of the first storage compartment s equal to or greater than a first termination reference temperature N+a, and
   wherein the first termination reference temperature N+a is higher than a set temperature N of the first storage compartment and lower than an upper limit temperature of the first storage compartment.

2. The method of claim 1, wherein when a temperature of the second storage compartment is equal to or less than a lower limit temperature of the second storage compartment, the normal stop condition of the second cooling cycle is satisfied.

3. The method of claim 1, wherein, to determine whether the forced termination condition of the second cooling cycle is satisfied, a controller further determines whether a temperature of the second storage compartment is equal to or less than a second termination reference temperature M-b, wherein the second termination reference temperature M-b is lower than a set temperature M of the second storage compartment and higher than a lower limit temperature of the second storage compartment.

4. The method of claim 1, wherein the forced termination condition of the second cooling cycle is satisfied
   i) when a temperature of the first storage compartment is equal to or greater than a first termination reference temperature N+a, wherein the first termination reference temperature N+a is higher than a set temperature N of the first storage compartment and lower than an upper limit temperature of the first storage compartment, and ii) when a temperature of the second storage compartment is equal to or less than a second termination reference temperature M-b, wherein the second termination reference temperature M-b is lower than a set temperature M of the second storage compartment and higher than a lower limit temperature of the second storage compartment.

5. The method of claim 1, wherein the compressor is stopped when the second cooling cycle is forcibly terminated or normally stopped.

6. The method of claim 1, further comprising starting a third cooling cycle for the first storage compartment when the second cooling cycle is forcibly terminated or normally stopped.

7. The method of claim 6, wherein the first fan is rotated for a first reference time and then is stopped when the third cooling cycle starts, and
wherein a valve configured to supply refrigerant to an evaporator for the first storage compartment is turned on for a second reference time shorter than the first reference time and then is turned off.

8. The method of claim 1, further comprising:
determining whether an output change condition of the second fan is satisfied while the second fan operates when a temperature of the second storage compartment reaches a set temperature M between an upper limit temperature and a lower limit temperature of the second storage compartment; and
changing a speed of the second fan when the output change condition of the second fan is satisfied.

9. The method of claim 8, wherein when a temperature of the first storage compartment is lower than a set temperature N between an upper limit temperature and a lower limit temperature of the first storage compartment, the output change condition of the second fan is satisfied.

10. The method of claim 8, wherein when the output change condition of the second fan is satisfied, the speed of the second fan is decreased.

11. The method of claim 10, wherein when the output change condition of the second fan is satisfied, a degree of decrease in the speed of the second fan is variable according to the temperature of the first storage compartment.

12. The method of claim 8, wherein when the temperature of the first storage compartment is higher than a set temperature N between the upper limit temperature and the lower limit temperature of the first storage compartment, the speed of the second fan is maintained or increased.

13. The method of claim 1, wherein the second storage compartment is a freezing compartment and the second fan is a freezing compartment fan, and
wherein when the freezing compartment fan operates, an ice making fan that supplies cold air of the freezing compartment to an ice making assembly also operates.

14. The method of claim 1, wherein the first fan operates at a first speed when the first cooling cycle operates, and wherein, when an operation of the second cooling cycle starts, the first fan operates for a predetermined time at a second speed less than the first speed and then is stopped.

15. A method of controlling a refrigerator, the method comprising:
starting a first cooling cycle that cools a first storage compartment by operating a compressor and a first fan;
determining whether a start condition of a second cooling cycle that cools a second storage compartment is satisfied;
operating a second fan for the second storage compartment when the start condition of the second cooling cycle is satisfied;
determining whether a forced termination condition of the second cooling cycle is satisfied before a normal stop condition of the second cooling cycle is satisfied; and
stopping the second cooling cycle when the forced termination condition of the second cooling cycle is satisfied before the normal stop condition of the second cooling cycle is satisfied,
wherein, to determine whether the forced termination condition of the second cooling cycle is satisfied, a controller determines whether the temperature of the second storage compartment is equal to or less than a second termination reference temperature M-b, and
wherein the second termination reference temperature M-b is lower than a set temperature M of the second storage compartment and higher than a lower limit temperature of the second storage compartment.

16. A method of controlling a refrigerator, the method comprising:
starting a first cooling cycle that cools a first storage compartment by operating a compressor and a first fan;
determining whether a start condition of a second cooling cycle that cools a second storage compartment is satisfied;
operating a second fan for the second storage compartment when the start condition of the second cooling cycle is satisfied;
determining whether a forced termination condition of the second cooling cycle is satisfied before a normal stop condition of the second cooling cycle is satisfied; and
stopping the second cooling cycle when the forced termination condition of the second cooling cycle is satisfied before the normal stop condition of the second cooling cycle is satisfied,
wherein the forced termination condition of the second cooling cycle is satisfied
i) when a temperature of the first storage compartment is equal to or greater than a first termination reference temperature N+a, wherein the first termination reference temperature N+a is higher than a set temperature N of the first storage compartment and lower than an upper limit temperature of the first storage compartment, and
ii) when a temperature of the second storage compartment is equal to or less than a second termination reference temperature M-b, wherein the second termination reference temperature M-b is lower than a set temperature M of the second storage compartment and higher than a lower limit temperature of the second storage compartment.

17. A method of controlling a refrigerator, the method comprising:
starting a first cooling cycle that cools a first storage compartment by operating a compressor and a first fan;
determining whether a start condition of a second cooling cycle that cools a second storage compartment is satisfied;
operating a second fan for the second storage compartment when the start condition of the second cooling cycle is satisfied;

determining whether a forced termination condition of the second cooling cycle is satisfied before a normal stop condition of the second cooling cycle is satisfied; and stopping the second cooling cycle when the forced termination condition of the second cooling cycle is satisfied before the normal stop condition of the second cooling cycle is satisfied, the stopping of the second cooling cycle including:

stopping the second fan;

turning on a valve configured to supply refrigerant to an evaporator for the first storage compartment; and operating the first fan to start a third cooling cycle for the first storage compartment after the second cooling cycle is forcibly terminated or normally stopped.

18. A method of controlling a refrigerator, the method comprising:

starting a first cooling cycle that cools a first storage compartment by operating a compressor and operating a first fan at a first speed and switching a valve to a first state to supply refrigerant to a first evaporator for the first storage compartment;

determining whether a start condition of a second cooling cycle that cools a second storage compartment is satisfied;

operating a second fan for the second storage compartment and switching the valve to a second state to supply refrigerant to a second evaporator for the second storage compartment when the start condition of the second cooling cycle is satisfied; and additionally operating the first fan while the second fan operates, the additionally operating of the first fan including operating the first fan at a second speed less than the first speed for a predetermined time.

* * * * *